United States Patent [19]
Farmer et al.

[11] Patent Number: 5,979,586
[45] Date of Patent: Nov. 9, 1999

[54] VEHICLE COLLISION WARNING SYSTEM

[75] Inventors: Michael E. Farmer, West Bloomfield; Michael P. Bruce, Brighton, both of Mich.

[73] Assignee: Automotive Systems Laboratory, Inc., Farmington Hills, Mich.

[21] Appl. No.: 09/018,256

[22] Filed: Feb. 4, 1998

Related U.S. Application Data

[60] Provisional application No. 60/037,299, Feb. 5, 1997.

[51] Int. Cl.[6] .................................................. B60K 28/10
[52] U.S. Cl. ......................... 180/274; 180/169; 340/435; 340/903
[58] Field of Search .................................. 280/735, 734; 180/271, 274, 169, 167; 701/45; 340/435, 433, 903, 436; 381/86

[56] References Cited

U.S. PATENT DOCUMENTS

| | | | |
|---|---|---|---|
| 3,714,648 | 1/1973 | Bennett et al. | 343/5 DP |
| 4,219,696 | 8/1980 | Kogure et al. | 179/1 G |
| 4,236,039 | 11/1980 | Cooper | 179/1 GQ |
| 4,262,170 | 4/1981 | Bauer | 179/1 GQ |
| 4,528,563 | 7/1985 | Takeuchi | 340/903 |
| 4,731,848 | 3/1988 | Kendall et al. | 381/63 |
| 5,046,097 | 9/1991 | Lowe et al. | 381/17 |
| 5,095,507 | 3/1992 | Lowe | 381/17 |
| 5,105,462 | 4/1992 | Lowe et al. | 38/17 |
| 5,187,692 | 2/1993 | Haneda et al. | 367/135 |
| 5,208,860 | 5/1993 | Lowe et al. | 381/17 |
| 5,235,315 | 8/1993 | Cherry et al. | 340/435 |
| 5,314,037 | 5/1994 | Shaw et al. | 180/169 |
| 5,357,438 | 10/1994 | Davidian | 364/461 |
| 5,450,057 | 9/1995 | Watanabe | 340/435 |
| 5,500,900 | 3/1996 | Chen et al. | 381/17 |
| 5,521,981 | 5/1996 | Gehring | 381/17 |
| 5,528,217 | 6/1996 | Adams | 340/435 |
| 5,534,845 | 7/1996 | Issa et al. | 340/425.5 |
| 5,563,951 | 10/1996 | Wang et al. | 381/24 |
| 5,596,644 | 1/1997 | Abel et al. | 381/17 |
| 5,598,164 | 1/1997 | Reppas et al. | 342/70 |
| 5,631,639 | 5/1997 | Hibino et al. | 340/903 |
| 5,646,612 | 7/1997 | Byon | 340/903 |
| 5,653,462 | 8/1997 | Beard et al. | 280/735 |
| 5,664,019 | 9/1997 | Wang et al. | 381/71.1 |
| 5,699,057 | 12/1997 | Ikeda et al. | 340/937 |
| 5,829,782 | 11/1998 | Breed et al. | 280/735 |

OTHER PUBLICATIONS

Bauck and Cooper, "Generalized Transaural Stereo and Applications", Journal of AES, vol. 44, No. 9, Sep. 1996.

*Primary Examiner*—Christopher P. Ellis
*Assistant Examiner*—David R. Dunn
*Attorney, Agent, or Firm*—Lyon,P.C.

[57] ABSTRACT

A vehicle collision warning system converts collision threat messages from a predictive collision sensor into intuitive sounds which are perceived by the occupant to be directed from the direction of the potential collision. The type and volume of the sounds are dependent upon the estimated likelihood, severity, and commencement time of the collision. The types of sound are chosen to evoke the proper corrective action by the driver as necessary to avoid the collision or mitigate the effects thereof. Examples of the sounds include a horn, screeching tires, a siren, sounds of various types of vehicles and object, and voice commands. The sounds are stored monaurally and are converted to directional sounds using known techniques.

27 Claims, 3 Drawing Sheets

VEHICLE COLLISION WARNING SYSTEM

CROSS-REFERENCE TO RELATED APPLICATIONS

The instant application claims the benefit of prior U.S. Provisional Application Ser. No. 60/037,299 filed on Feb. 5, 1997.

TECHNICAL ART

The instant invention generally relates to systems and methods for vehicle collision avoidance and more particularly systems and methods for warning a driver of an imminent collision so that the driver can take corrective action.

BACKGROUND OF THE INVENTION

Known arrangements for alerting a vehicle driver to potential danger have utilized lights and/or buzzers located in the vehicle instrument panel. In addition, for collision avoidance systems, a heads-up display has been proposed to display threat symbols for the driver to see while driving.

However, audible tones or warning lights have not proven to be completely satisfactory because they are ineffective as warning devices for high threat real-time situations. Warning lights on an instrument panel will not be seen unless the operator looks at them, which inadvertently causes the driver's attention to be diverted from the road. Audible tones (buzzers, etc) tend to only confuse the driver since the tones do not inherently provide a context for the tone unless the driver is provided with considerable training. For example, a driver can not necessarily determine the possible source or type of danger simply from hearing the tone. In addition, in very complex situations, humans tend to not notice these tone sounds at all, and if anything, the noise only adds to the level of confusion in the situation.

Heads-up displays also suffer from the drawback that a driver's attention can be inadvertently diverted from the road in order to concentrate on a particular display region of the windshield. For situations such as a possible collision, the warning information must be immediately recognized by the operator to be effective. Requiring the operator to physically look to the display at a regular interval to see if a warning is present reduces the effectiveness of the warning system. Also for situations where an operator is less attentive than desired, such as driving when sleepy or while under the influence of alcohol, these visual monitor-type warnings are completely ineffective. In addition, many drivers, particularly older drivers with poor vision, find heads-up displays very awkward and difficult to use.

Faced with a potential crash, the driver must act quickly and decisively to take corrective action to avoid the crash. Under these circumstances, the typical driver does not normally have time to think about what to do or to comprehend messages from a typical display system. Instead, the operator needs intuitive cues which evoke the correct automatic driver reactions. The main disadvantage of prior art collision warning systems is that they do not provide such cues.

SUMMARY OF THE INVENTION

Thus, it is an object of the instant invention to provide a collision warning system, for use with a vehicle collision prediction system, which overcomes the above-noted deficiencies. The system of the instant invention detects possible collision threats and provides an alert to the driver in a manner that is not irritating, yet is effective and provides the driver with a warning that fits within the context of driving. In addition, the warning system of the instant invention does not require operator training, but rather is inherently intuitive to all drivers.

To this end, the instant invention provides a realistic audio warning to the driver when a collision is possible. The system transmits actual automobile sound samples at an amplitude and angular orientation commensurate with the level and direction of threat, such as based on time to collision, speed of collision, and probability of collision. The system generates a sound that is oriented relative to the driver to indicate the direction of the threat so as to focus the driver's attention in the direction of the threat.

Therefore, in accordance with the instant invention, a warning system for use in a vehicle collision prediction and avoidance system comprises a means for generating a context-sensitive warning for possible collision threats which produces sounds such as loud car and horn noises that indicate collision threats. The warning sound is generated to appear to come from the direction of the possible collision relative to the driver, and further preferably includes means for providing sound amplitude modification to simulate distance to the threat.

The instant invention preferably utilizes components from car audio equipment already installed in the vehicle in combination with an additional signal processor to generate the desired sound waveforms to simulate the spatial location and magnitude of the detected threat.

The system of the instant invention does not require any operator training and provides information to the driver in a manner which simulates real world type events, such as the sounding of a vehicle horn or screeching of vehicle tires by another vehicle that poses a collision threat, but without requiring action on the part of the driver of the other vehicle. Input is provided from a separate vehicle collision prediction and avoidance system.

The instant invention will be more fully understood after reading the following detailed description of the preferred embodiment with reference to the accompanying drawings.

DETAILED DESCRIPTION OF THE PREFERRED EMBODIMENT(S)

Figure 1:
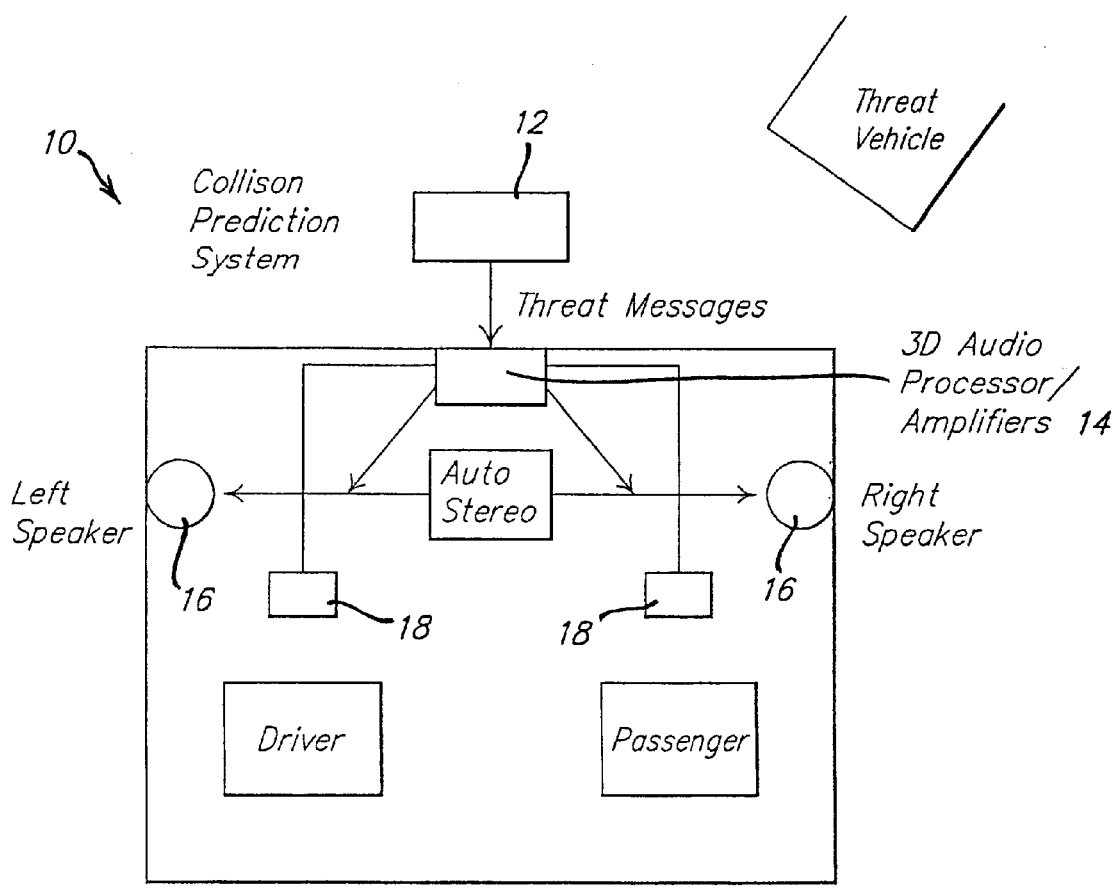
FIG. 1 is a block diagram of the instant invention incorporating the standard vehicle stereo sound system.

FIG. 1 illustrates the overall collision warning system 10 in accordance with the instant invention. A collision prediction system 12 detects possible collision threats using a range and bearing sensing circuit as is understood to one having ordinary skill in the art. For example, U.S. patent application Ser. No. 09/009,035 filed on Jan. 20, 1998 entitled "Predictive Collision Sensing System"; and assigned to the assignee of the instant invention describes one possible collision warning system. A warning control processor 14 is responsive to the collision prediction system 12 to generate synthetic automobile and horn sound samples at a specific spatial bearing relative to the host vehicle 1 corresponding to the angle of the host vehicle 1 relative to the threat.

Figure 3:
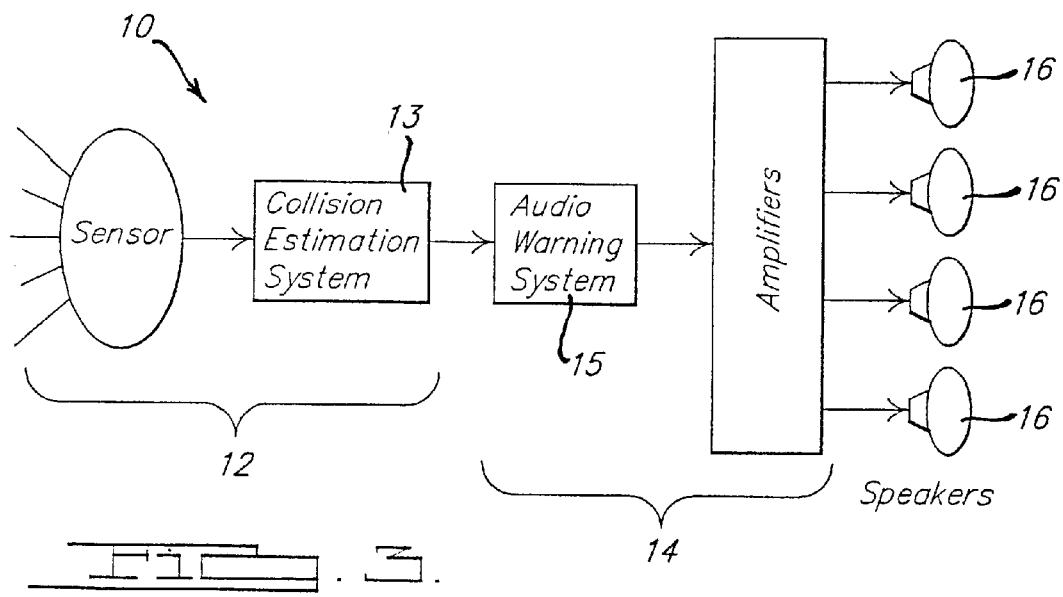
FIG. 3 is a block diagram of the instant invention incorporating a quadraphonic sound system.

The actual amplitude and type of sound produced is based on the detected type and level of threat. For example, if a threat were a vehicle that is either close to the host, or is moving very quickly towards the host vehicle 1, the sound amplitude will be increased to a tolerable maximum to communicate the seriousness of the oncoming threat. This tolerable maximum level is set sufficiently great to act as an effective alert, but not so great that the driver is startled into panic. The warning sounds are generated with appropriate phase and amplitude and provided to the existing automotive stereo speakers 16 through tie in wiring from the directive audio warning system 15, as illustrated in FIG. 3 which provides appropriate cues to the driver.

The collision warning system 10 further includes an occupant position sensor 18 for determining the location of a driver both in lateral location in the seat, as well as longitudinal distance from the instrument panel, so as to determine the appropriate acoustic path lengths for the left and right speakers to the occupant's left and right ears. The collision warning system 10 operates based on a model of a human head and the distance and time taken for sound from the right speaker 16 to reach the opposite (left) ear and vice versa.

Figure 2:
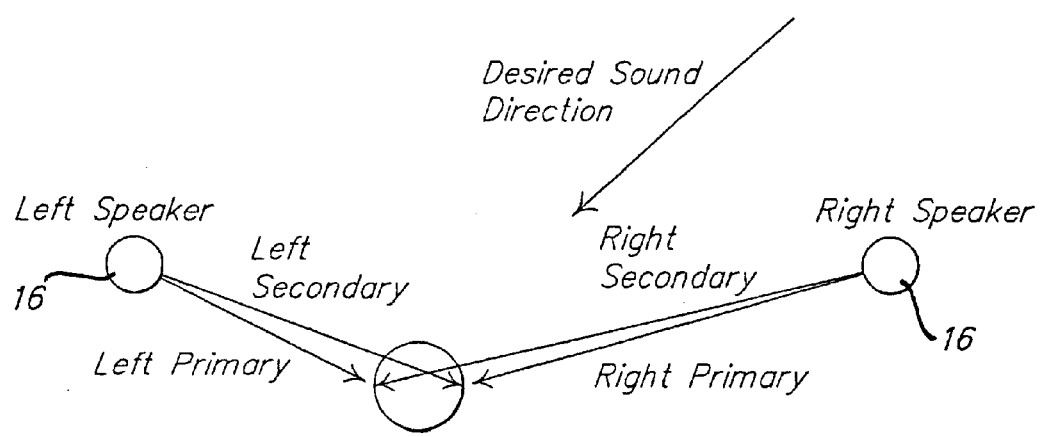
FIG. 2 illustrates the process of simulating a directional sound using a stereo sound system.

In one embodiment, an audio warning system 15 generates two acoustic wavefronts for each speaker. A first/primary wavefront provides the sound to the ear facing the given speaker, while a secondary wavefront provides a cancellation signal to the ear on the opposite side to make it appear as if all of the sound from one side is going into the corresponding ear. FIG. 2 illustrates the geometry of this processing. The audio warning system 15 computes the phase and amplitude shifts for each wavefront and modifies the synthetic automobile/horn sounds accordingly.

In addition, the system has the ability to reconfigure the sound to adapt to the occupants. More specifically, warning control processor 14 can generate tones that are detected by a centrally located microphone 20, which may be mounted in the headliner or on the rear view mirror The received tones are then processed to determine the scaling in phase and signal strength from each speaker to provide the correct 3-D sound. The audio warning system 15 may accomplish this calibration without a microphone 20 using a passenger seat occupant location system, which can provide the size and type of occupant, and infer the changes in the sound propagation path due to the added person.

The collision estimator system 13 supplies the potential target's coordinates and its respective probability of threat to the audio warning system 15 as shown in FIG. 3. A 3-D algorithm is used to acoustically place the target in space corresponding to the coordinates supplied by the tracker in the collision estimator system 13. Depending on the severity of threat, various intensities, types, and locations of sounds are used for signaling the driver of possible collisions.

Figures 4, 5:
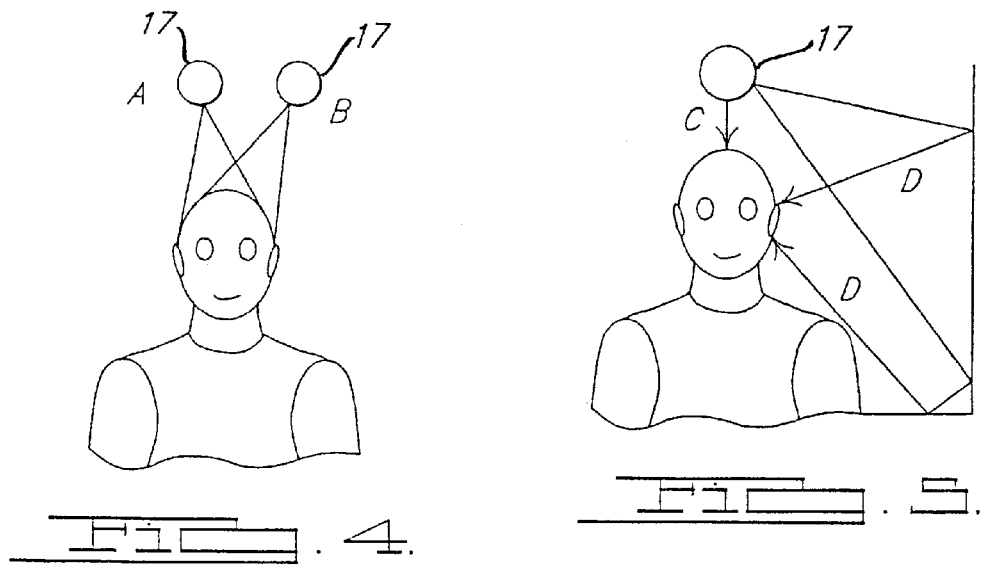
FIG. 4 illustrates the process of hearing directional sounds.
FIG. 5 illustrates the process of hearing sounds within an enclosure.

Spatial localization is facilitated via Interaural Time Differences (ITD) and Interaural Intensity Differences (IID). As shown in FIG. 4, when a sound source 17 is located at A, the IID and ITD are identical for both ears, thus the location of the sound source 17 is identified to be straight ahead. When the sound source 17 is instead located at B, it can be seen that the sound will arrive at the right ear slightly later than the left. This interaural phase difference can be perceived by one's ears when signals below 1 kHz are used. With signals above 1.5 kHz, the head behaves as a shield and attenuates the signal resulting in a IID. Below this frequency, diffraction occurs which significantly reduces this effect. Both of these factors help us to localize sources in space.

These two factors alone cannot explain how human hearing can localize sound sources in a 360 degree circle around us, in elevations 90 degrees above and below us, and in distances close up and distant.

Another important factor is called the Head Related Transfer Function (HRTF). This is the transformation that occurs as a result of the folding and shape of the pinnae (the outer ear flap), the head, and the upper torso. These time and frequency changes that occur are heard at the tympanic membrane (the eardrum). These effects dramatically help the listener to localize sound sources. The HRTF is found by inserting a microphone into the ear canal and recording impulses from an array of loudspeakers.

There are other effects particularly in a diffuse field known as the environmental context. Given that in an enclosed space such as a room or an automobile, there is the direct wave, C, and the reflected waves, D, as shown in FIG. 5. The reflected waves are thus delayed in time till they arrive at the listener. Because of their size, larger rooms have longer delays than smaller rooms. Depending upon the ratio of these direct/reflected waves, whether these reflected waves are early or later in time, will determine the degree of ambiance to the character of the sound. The listener can tell the size and type of room he is in by these kinds of changes that occur to the signal.

Another factor affecting the perception of directional sound is the distance that the sound is perceived to be from the listener. Typically, intensity is used along with high frequency content. That is, the closer a source is, the louder it is. Also, it is shown that over distance in air, the higher frequencies are attenuated. Thus, this is an additional cue for the perceived distance of the object.

The quality of the HRTF is important. Some are obtained using dummy heads, others with real subjects. The quality of the test instrumentation, the experience, and the knowledge of the tester is important in obtaining a good quality HRTF. For example, HRTF's may be obtained on a real subject who has been shown to have excellent directional cueing capability. The quality of the HRTF has been shown to affect in how well other subjects can localize the signals.

Figure 6:
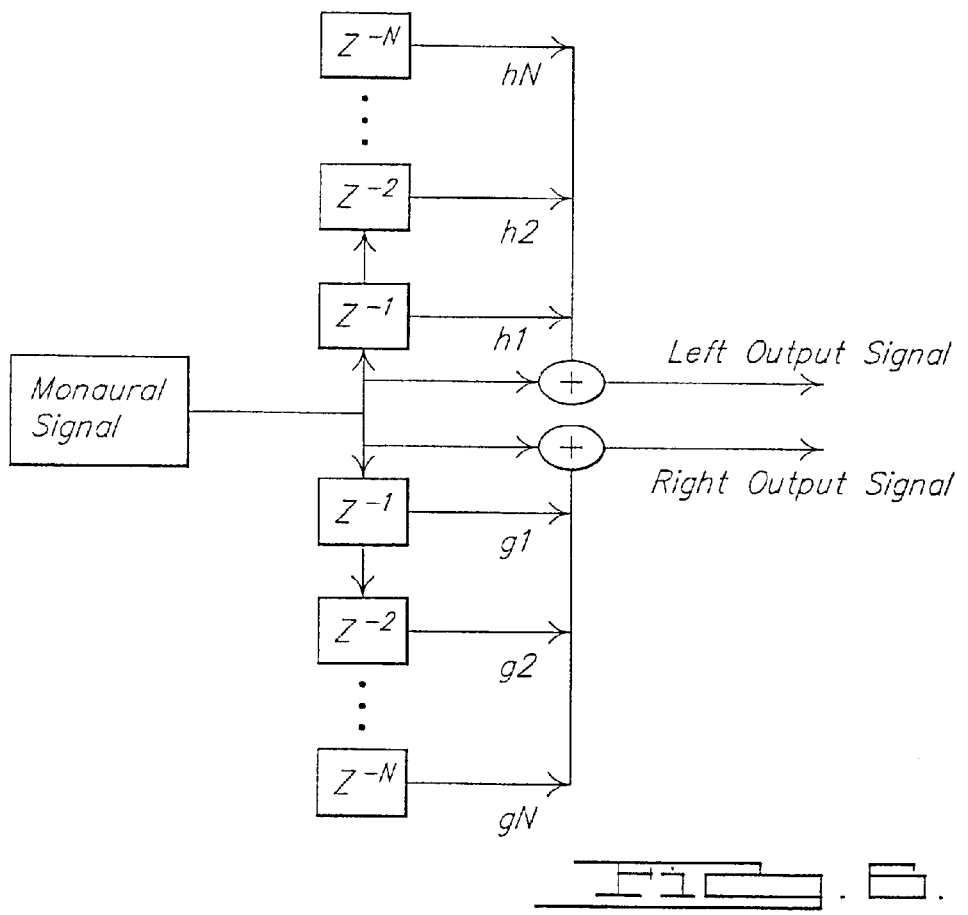
FIG. 6 is a block diagram of a system for creating stereophonic sound signals for creating directional sounds from a monaural sound signal.

Referring to FIG. 6, in accordance with known techniques for generating directional sounds from monaural sounds, such as taught in U.S. Pat. No. 5,521,981, the HRTF's are simply convolved with the input monophonic signal using a FIR filter with multiple delays and gains, as accomplished with a tap-delay line with summed delayed inputs that are placed at the output after scaling. Thus both intensity and time processing is accomplished. The resultant signal carries the directional cueing desired. The processing is accomplished in real time utilizing a look-up table of pre-processed signals. If the desired location is not exactly at one of the reference points, linear interpolation is used. Other known techniques for generating directional sounds from monaural sounds may be alternately incorporated into the instant invention, such as taught by U.S. Pat. Nos. 4,219,696, 4,731,848, 5,500,9000, and 5,596,644.

Figure 7:
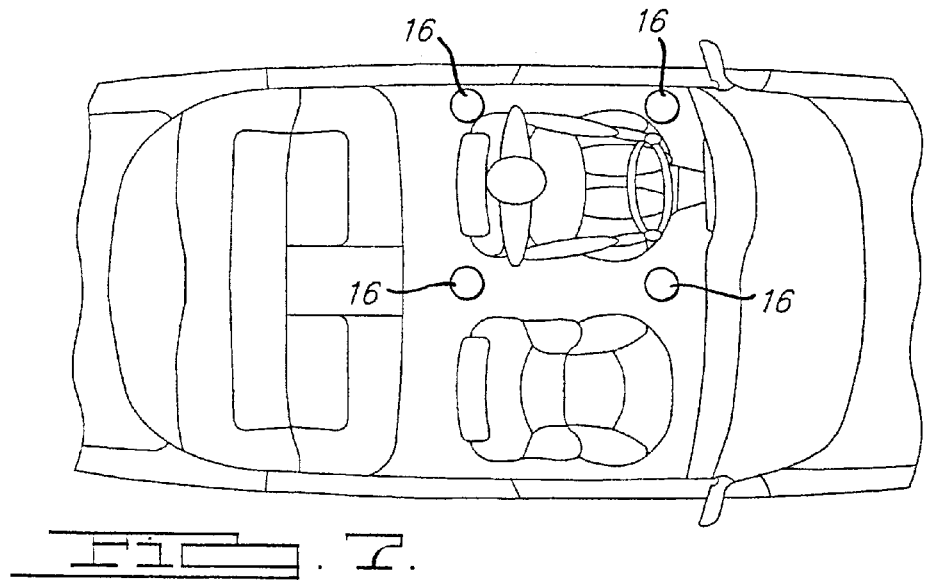
FIG. 7 illustrates a top view of vehicle incorporating the instant invention.
Figure 8:
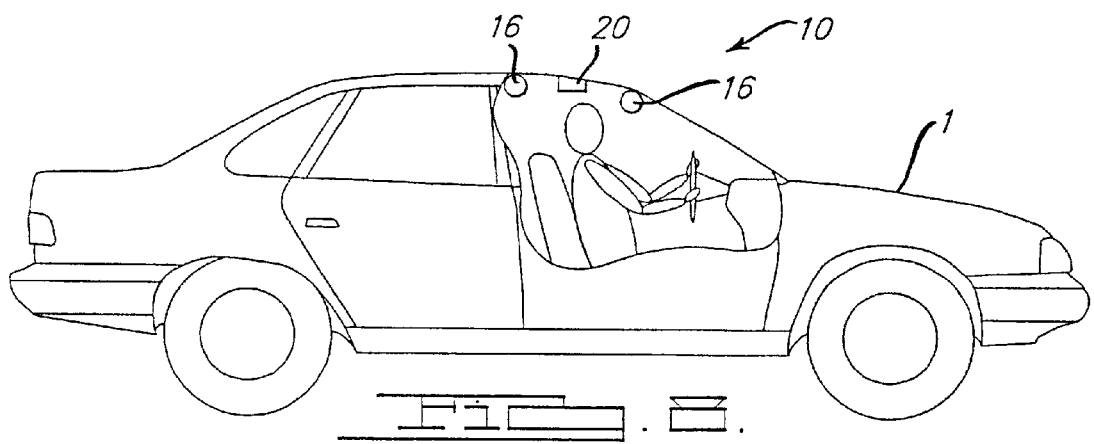
FIG. 8 illustrates a side view of a vehicle incorporating the instant invention.

Referring to FIGS. 7 and 8, a preferred embodiment of the instant invention incorporates four speakers 16 rather than the traditional two. This is to eliminate the reversals that often occur between signals straight ahead and to the rear. Although with two speaker 3-D technology, the signal is transformed such that the sound will appear to originate from the desired location, still the sound pressure itself is only coming from the front. This results in a 'cone of confusion' to the front and rear aspects of the listener. The solution is to use four speaker with sound pressure arising from both fore and aft. The system decides how much of the signal to send to the rears and fronts depending on target location. A spatial panning algorithm is used.

Another preferred embodiment of the system is one in which a passenger in addition to the driver is warned of an impending collision. So as to ensure localization accuracy, a crosstalk cancellation algorithm is used with a four input, four speaker, two listener array in the front along with the same in the rear. The algorithm is described fully in Bauck and Cooper, "Generalized Transaural Stereo and Applications", *Journal of AES*, Vol. 44, No. 9, September 1996 which is incorporated herein by reference.

For greater flexibility in making a system more transparent to the user and potentially less costly to install, speakers mounted in the headrest and dashboard could be used for convertibles and other more select vehicles. Also, ultrasound speakers have recently been developed that have pinpoint dispersion; thus eliminating reflection problems entirely. The difference signal in the audio range is what is heard over a very narrow focus.

Referring to FIG. 8, the speakers 16 are mounted in the headliner. The location and type of speakers 16 are such that early reflections which would increase spatialization error are dramatically reduced. The speakers 16 have a controlled dispersion pattern and are located equidistant from the center of the driver's head.

A microphone 20 is located above the driver's head which provides for noise cancellation in the event of a wide-band noise level above a certain threshold. However, this feature is rarely needed because with binaural signals, there is a 12 dB improvement in S/N and in the ability to detect and pick out a desired signal in an environment rich in multiple signals. Examples of when this sub-system would possibly be engaged would be when the windows are rolled down at highway speeds.

A hierarchy of collision warning stimuli is used to warn the driver. A decision is made at the collision estimator system 13 concerning the type, distance, and degree of seriousness of the target. Moving targets coming from the side are viewed differently than those coming from straight ahead. Non-stationary types of targets include bicycles, motorcycles, automobiles, sport utility vehicles, and small and large trucks. The sound library includes sample stimuli from all of these types. Other sounds are available for stationary targets. Distance of target is encoded using intensity or loudness of the stimulus from a Level 5 which is a possible but not certain collision (20 feet away as an example) to a Level 1 which is an impending collision (less than several feet). Velocities of both vehicles are taken into account. Degree of seriousness is reflected by the addition of the sounds of screeching tires, blaring horns, and artificially magnifying the size of the sound of the oncoming vehicle during convolution and placing it in the 'personal space' of the driver. The pitch and timbre of the horn will also be manipulated depending upon the seriousness of the threat. During the final moments of an impending collision, the sounds of a siren is added. At the last moment, ambiance information is added to the signal to make it appear that the target is actually inside the subject's vehicle, right next to him.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A vehicular collision warning system for warning an occupant of a collision, comprising:

a. a predictive collision sensing system for generating a signal estimating the direction relative to the vehicle of a potential collision, and for generating at least one signal selected from the group consisting of the estimated likelihood of said potential collisions the estimated severity of said potential collision the estimated commencement time of said potential collision, an estimated type of collision object, the distance to the collision object, and the relative velocity of the collision object with respect to the vehicle;

b. a memory for storing a plurality of sound signals, wherein each sound of said plurality of sound signals is selected from the group consisting of the sound of a potential collision object, the sound of a potential collision related event, and a siren sound;

c. a signal processor wherein said signal processor selects a sound signal from said plurality of sound signals responsive to at least one of said signals estimating the likelihood of said potential collision, the severity of said potential collision, the commencement time of said potential collision, the estimated type of collision object; and said signal processor adapts the amplitude of said sound signal responsive to at least one of said signals estimating the likelihood of said potential collision, the severity of said potential collision, the commencement time of said potential collision, the type of the collision object;

d. a plurality of speakers disposed within the vehicle; and e. a means incorporated within said signal processor for transforming said selected sound signal into a plurality of speaker signals, each said speaker signal operatively coupled to a respective one of said plurality of speakers, said plurality of speaker signals disposed so that the sound field generated by said plurality of speakers is perceived by the occupant to emanate from the estimated direction of a potential collision.

2. A vehicular collision warning system for warning an occupant of a collision as recited in claim 1, further comprising an occupant position sensor for sensing the position of the occupant, wherein said means incorporated within said signal processor for transforming said selected sound signal into a plurality of speaker signals is responsive to the position of the occupant.

3. A vehicular collision warning system for warning an occupant of a collision as recited in claim 1, wherein said plurality of sound signals is selected from the group consisting of: a horn sound, a screeching tire sound, a siren sound, a bicycle sound, a motorcycle sound, an automobile sound, a sport utility vehicle sound, a small truck sound, a large truck sound, a stationary object sound, a pedestrian sound, an animal sound, and a voice command.

4. A method of warning a vehicular occupant of a collision threat, comprising:
 a. generating an estimate of collision direction of a potential collision using a predictive collision sensing system;
 b. generating at least one signal selected from the group consisting of the estimated likelihood of said potential collision, the estimated severity of said potential collision the estimated commencement time of said potential collision, and an estimated type of collision object;
 c. retrieving from memory a sound signal, wherein said sound signal is selected responsive to at least one of said signals estimating the likelihood of said potential collision, the severity of said potential collision, the commencement time of said potential collision, the estimated type of collision object from the group consisting of the sound of a potential collision object, the sound of a potential collision related event, and a siren sound;
 d. adapting the amplitude of said sound signal responsive to at least one of said signals estimating the likelihood of said potential collision, the severity of said potential collision, the commencement time of said potential collision, the type of collision object;
 e. responsive to said estimate of collision direction, transforming said sound signal into a plurality of speaker signals; and
 f. applying said plurality of speaker signals to an associated plurality of speakers so as to generate a sound field within the vehicle, wherein said plurality of speaker signals is adapted so that the occupant perceives said sound signal to emanate from a direction corresponding to said estimate of collision direction.

5. A method of warning a vehicular occupant of a collision threat as recited in claim 4, wherein said operation of generating at least one signal comprises generating an estimate of the likelihood of a potential collision using said predictive collision sensing system, and said operation of retrieving from memory a sound signal suggestive of collision related event is responsive to said estimate of the likelihood of a potential collision.

6. A method of warning a vehicular occupant of a collision threat as recited in claim 4, wherein said operation of generating at least one signal comprises generating an estimate of the likelihood of a potential collision using said predictive collision sensing system, and the volume of said sound field is responsive to said estimate of the likelihood of a potential collision.

7. A method of warning a vehicular occupant of a collision threat as recited in claim 4, wherein said operation of generating at least one signal comprises generating an estimate of the severity of a potential collision using said predictive collision sensing system, and said operation of retrieving from memory a sound signal suggestive of collision related event is responsive to said estimate of the severity of a potential collision.

8. A method of warning a vehicular occupant of a collision threat as recited in claim 4, wherein said operation of generating at least one signal comprises generating an estimate of the severity of a potential collision using said predictive collision sensing system, and the volume of said sound field is responsive to said estimate of the severity of a potential collision.

9. A method of warning a vehicular occupant of a collision threat as recited in claim 4, wherein said operation of generating at least one signal comprises generating an estimate of the commencement time of a potential collision using said predictive collision sensing system, and said operation of retrieving from memory a sound signal suggestive of collision related event is responsive to said estimate of the commencement time of a potential collision.

10. A method of warning a vehicular occupant of a collision threat as recited in claim 4, wherein said operation of generating at least one signal comprises generating an estimate of the commencement time of a potential collision using said predictive collision sensing system, and the volume of said sound field is responsive to said estimate of the commencement time of a potential collision.

11. A method of warning a vehicular occupant of a collision threat as recited in claim 4, further comprising the operation of sensing the position of the occupant, wherein the operation of transforming said sound signal into a plurality of speaker signals is responsive to said position of the occupant.

12. A vehicular collision warning system for warning an occupant of a collision as recited in claim 1, further comprising one or more amplifiers interposed between said signal processor and said speakers for amplifying said speaker signals.

13. A vehicular collision warning system for warning an occupant of a collision as recited in claim 1, wherein said signal processor adapts the amplitude of said sound signal responsive to said distance to the collision object.

14. A vehicular collision warning system for warning an occupant of a collision as recited in claim 1, wherein said signal processor adapts the pitch of said sound signal responsive to at least one of said signals estimating the likelihood of said potential collision, the severity of said potential collision, the commencement time of said potential collision, the type of collision object.

15. A vehicular collision warning system for warning an occupant of a collision as recited in claim 1, wherein said signal processor adapts the timbre of said sound signal responsive to at least one of said signals estimating the likelihood of said potential collision, the severity of said potential collision, the commencement time of said potential collision, the type of collision object.

16. A vehicular collision warning system for warning an occupant of a collision as recited in claim 1, wherein said signal processor adapts the location of said sound signal responsive to at least one of said signals estimating the likelihood of said potential collision, the severity of said potential collision, the commencement time of said potential collision, the type of collision object.

17. A vehicular collision warning system for warning an occupant of a collision as recited in claim 1, wherein said estimate of the severity of said potential collision is responsive to at least one signal selected from the group consisting of the distance to the collision object and the relative velocity of the collision object with respect to the vehicle.

18. A vehicular collision warning system for warning an occupant of a collision as recited in claim 1, wherein said means incorporated within said signal processor for transforming said selected sound signal into a plurality of speaker signals incorporates a Finite Impulse Response filter that is responsive to a Head Related Transfer Function.

19. A vehicular collision warning system for warning an occupant of a collision as recited in claim 2, wherein said means incorporated within said signal processor for transforming said selected sound signal into a plurality of speaker signals determines the acoustic path length between at least one of said plurality of speakers and at least one ear of the occupant.

20. A vehicular collision warning system for warning an occupant of a collision as recited in claim 2, wherein said occupant position sensor determines at least one signal selected from the group consisting of the size of the occupant and the type of the occupant, and said means incorporated within said signal processor for transforming said selected sound signal into a plurality of speaker signals is responsive to said at least one signal.

21. A vehicular collision warning system for warning an occupant of a collision as recited in claim 1, further comprising a microphone for generating a first signal, wherein said microphone is operatively coupled to said signal processor, said signal processor generates at least one tone operatively coupled to at least one of said plurality of speakers, said signal processor detects said at least one tone from said first signal and generates a second signal responsive to said first signal, and said means incorporated within said signal processor for transforming said selected sound signal into a plurality of speaker signals is responsive to said second signal.

22. A vehicular collision warning system for warning an occupant of a collision as recited in claim 1, wherein said microphone is centrally located above the occupant's head.

23. A vehicular collision warning system for warning an occupant of a collision as recited in claim 1, further comprising a microphone for generating a first signal, wherein said microphone is operatively coupled to said signal processor, said signal processor determines a noise level from said first signal, said signal processor compares said noise level with a threshold, and if said noise level exceeds said threshold, said signal processor adapts said speaker signals so as to cancel at least some noise in said sound field.

24. A vehicular collision warning system for warning an occupant of a collision as recited in claim 1, wherein said plurality of speakers comprises four (4) speakers.

25. A vehicular collision warning system for warning an occupant of a collision as recited in claim 1, wherein at least one of said plurality of speakers is mounted in a location selected from the group consisting of a headrest, a dashboard, and a headliner.

26. A vehicular collision warning system for warning an occupant of a collision as recited in claim 1, wherein said means incorporated within said signal processor for transforming said selected sound signal into a plurality of speaker signals generates first and second acoustic wavefronts from each speaker, wherein said first acoustic wavefront provides a sound signal to a proximal ear, and said second acoustic wavefront provides a sound cancellation signal to a distal ear.

27. A vehicular collision warning system for warning an occupant of a collision as recited in claim 1, wherein said plurality of speakers are substantially equidistant to the nominal center of the occupant's head.

* * * * *